United States Patent
Lundell

(10) Patent No.: US 8,851,381 B2
(45) Date of Patent: Oct. 7, 2014

(54) MOTOR AND MOTOR DRIVE DIAGNOSTIC SYSTEM USING BARCODE

(71) Applicant: Rockwell Automation Technologies, Inc., Mayfield Heights, OH (US)

(72) Inventor: Thomas Lundell, Lakeville, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 41 days.

(21) Appl. No.: 13/654,306

(22) Filed: Oct. 17, 2012

(65) Prior Publication Data

US 2014/0103122 A1 Apr. 17, 2014

(51) Int. Cl.
*G01M 17/00* (2006.01)

(52) U.S. Cl.
USPC ................... 235/462.13; 701/33.2

(58) Field of Classification Search
USPC .................... 235/462.13; 701/33.2
See application file for complete search history.

(56) References Cited

U.S. PATENT DOCUMENTS

| | | | | |
|---|---|---|---|---|
| 7,462,999 | B2* | 12/2008 | Mitchell et al. | 318/490 |
| 2005/0035752 | A1* | 2/2005 | Bertness et al. | 324/120 |
| 2008/0023547 | A1* | 1/2008 | Raichle et al. | 235/462.13 |
| 2009/0020609 | A1* | 1/2009 | Cohen et al. | 235/462.01 |
| 2009/0228694 | A1* | 9/2009 | Karstens | 713/1 |
| 2013/0204487 | A1* | 8/2013 | Ovens | 701/33.2 |

OTHER PUBLICATIONS

Online Support, http://support.automation.siemens.com/WW/view/en/56295795; last accessed Oct. 17, 2012.
Industry Online Support App 2.0: Discover the new features, http://www.youtube.com/watch?v=5Np0V9AzWhl, Apr. 23, 2012, SiemensIndustryUS.

* cited by examiner

*Primary Examiner* — Daniel Hess
(74) *Attorney, Agent, or Firm* — Fletcher Yoder, P.C.

(57) ABSTRACT

A motor drive system includes a motor drive configured to provide signals to an electric motor to drive the motor in operation. A barcode is disposed on the motor drive and is configured to be scanned by a user device to provide the user device with information relating to the motor drive or operation of the motor drive.

20 Claims, 3 Drawing Sheets

MOTOR AND MOTOR DRIVE DIAGNOSTIC SYSTEM USING BARCODE

BACKGROUND

The invention relates generally to motor drive systems, and more specifically, to systems and methods to perform diagnostics for motion control systems.

Electric motors are employed in a variety of applications, such as material packaging, metal forming, paper handling, textiles, and so forth. In a typical arrangement, a motor drive sends signals to the electric motor to control operation of the electric motor. Over time, operation of the electric motor results in wear and tear. Routine maintenance and servicing can generally counteract the effects of wear and tear. However, identifying the root cause of maintenance issues (e.g., performing diagnostics) may be difficult and time-consuming.

BRIEF DESCRIPTION

The embodiments described herein enable diagnostics for motor drive systems, even for systems with limited visualization capabilities. In particular, a barcode may be disposed on a motor or a motor drive of the motor drive system. The barcode may be static (e.g., a sticker) or dynamic (e.g., a digital image generated and shown on a display). The barcode provides information relating to the motor or operation of the motor drive system. For example, a static barcode may provide plain-text information related to a nameplate of the motor. On the other hand, a dynamic barcode may provide a network address that subsequently provides troubleshooting guidance for the motor. The barcode enables a user with a user device (e.g., barcode reader on a phone) to obtain information from a variety of resources to assist with diagnostics for the motor drive system.

While the ensuing discussion is directed towards motor drive systems, it should be appreciated that the techniques of the present disclosure may be applied to a variety of industrial automation equipment, which may individually or collectively include industrial controllers, networks and communications systems, power supplies, signal conditioners, relays, timers, and the like.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present disclosure is directed to a motor drive system having a barcode with features to enable local diagnostics of the system. In particular, the barcode (e.g., quick response barcode) may be static or dynamic and provides information relating to a motor or operation of the motor. In the case of a dynamic barcode, a motor drive generates the dynamic barcode based on an operational issue experienced by the motor. The dynamic barcode encodes a site (e.g., website) containing information on how to resolve the operational issue, thereby enabling an operator to perform maintenance on the motor drive system efficiency and effectively. In certain embodiments, the code may lead to various motor or drive evaluation aids, such as error logs, historical data, performance data, catalog data, and so forth. However, it should be noted that in certain embodiments, the barcode may directly encode all of the information to be displayed, such as nameplate information related to the motor. In typical motor drive systems, the amount of viewable area on motor drives, motors, and the like is limited, and the barcode enables a large amount of information to be communicated in a relatively small amount of area, and then allows for much more information to be accessed based on the information encoded by the barcode.

Figure 1:
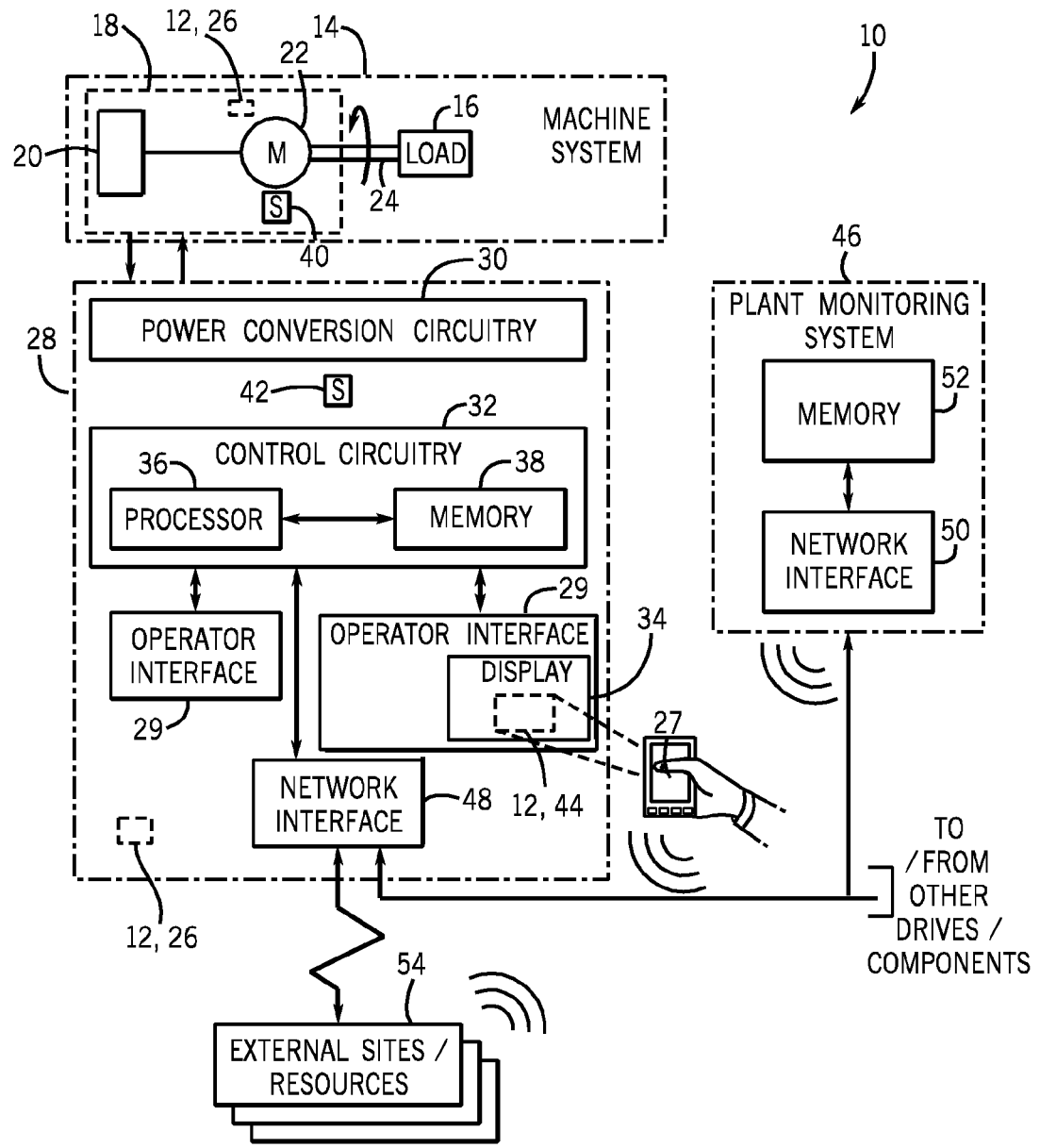
FIG. 1 is a schematic diagram of an embodiment of a motor drive system having a barcode in accordance with aspects of the present techniques.

Turning now to the figures, FIG. 1 illustrates an embodiment of a motor drive system 10 having one or more barcodes 12 with features to enable efficient troubleshooting (or more generally, monitoring and evaluation) of the motor drive system 10. The motor drive system 10 has a machine system 14 with one or more components to produce rotational energy for a load 16. Although the motor drive system 10 is illustrated as a rotational system, the techniques of the present disclosure may be applied to a variety of motion systems, such as linear motors and the like. The load 16 may be any device that can utilize the rotational energy produced by the machine system 14, such as a turbine, a compressor, and the like. It should be borne in mind that any of a vast number of driven loads may be coupled to the motor and motor drive. Indeed, in many applications, many such motors and drives may be coupled in a plant, factory, machine system or process, and these may be interconnected via networks for coordination of their operation, and for communicating with more centralized monitoring and control systems.

The machine system 14 includes a rotor/stator system 22 having a shaft 24, which is coupled to the load 16. A motor 18 (e.g., electric induction motor) includes the rotor/stator system 22. The motor 18 rotates the shaft 24, thereby driving the load 16 into rotation. The motor 18 is powered and controlled by a motor drive 28. That is, the motor drive 28 provides signals to the motor 18 to drive the motor in operation and to adjust a speed of the motor 18. As shown, the motor 18 includes an encoder 20, which monitors an angular position or angular velocity of the shaft 24. Wherein provided, the encoder 20 sends a signal to the motor drive 28 that is indicative of the position or velocity of the shaft 24. Subsequently, the motor drive 28 may adjust the power output to the motor 18 (e.g., the frequency of the drive signals), thereby controlling its speed, based on the signal from the encoder 20.

The motor 18 and/or the motor drive 28 may include the barcodes 12 (e.g., static barcodes 26). In certain embodiments, the static barcodes 26 may be stickers applied to viewable portions of the motor 18 and/or, the motor drive 28. The static barcodes 26 encode static information relating to their respective components, which is useful for troubleshooting the motor drive system 10, or more generally, for accessing data relating to the motor or motor drive. For example, the static barcode 26 may encode information relating to a nameplate of the motor drive 28, and may include information such as the model, manufacturer, rated power, warranty, and the like. A user device 27 scans and decodes the static barcode 26 into plain text containing the nameplate information, which may assist an operator in troubleshooting the machine system 14. In a presently contemplated embodiment, the user device 27 may be a phone equipped with a camera to scan and decode the static barcode 26. The phone may be carried throughout the industrial facility in which the machine system 14 is installed, thereby enabling the operator to efficiently look up nameplate information. In practice, any of a variety of readers and systems may be employed for this purpose. This may include general purpose devices with appropriate applications or routines installed on them, or special purpose or dedicated readers designed for data collection and so forth. Where desired, a reader may be coupled to a laptop or other mobile computing device to allow for accessing data (e.g., web pages and so forth) when an operator is near the motor or motor drive.

In certain embodiments, the static barcode 26 may encode a link to a site (e.g., an internal site or an external website) containing the aforementioned nameplate information, any desired general information on the equipment, or specific information regarding troubleshooting or motor or drive performance and operation. The user device 27 scans and decodes the website link from the static barcode 26. Subsequently, the user device 27 is directed to and displays one or more pages from the site. Accordingly, the static barcodes 26 enable an operator to quickly look up maintenance information for the rotor/stator system 22, the encoder 20, the motor drive 28, or any combination thereof. In certain implementations, the static barcodes 26 may include a timestamp for which the corresponding equipment was most recently serviced. The encoded timestamp may be updated periodically by replacing the existing static barcode with a new one.

As shown, the motor drive 28 is used to detect and control the speed of the motor 18. In a presently contemplated embodiment, the motor drive 28 also includes features to enable efficient troubleshooting of the motor drive system 10. As shown, the motor drive 28 includes an operator interface 29, power conversion circuitry 30, control circuitry 32, and a display 34.

The operator interface 29 (e.g., human-machine interface) enables operator interaction with the motor drive 28. For example, the operator may adjust a speed set point for the motor 18 or acknowledge an operational issue with the motor drive 28. To this end, the operator interface 29 generally includes input devices such as a keypad, stylus, pushbutton, dial, or any form of transducer that converts a physical interaction with the operator interface 29 into an electrical signal input.

The power conversion circuitry 30 conditions current from a power source into a suitable form for the motor 18. In particular, the power conversion circuitry 30 may include rectifiers, inverters, switches (e.g., insulated gate bipolar transistors, or IGBTs), and the like. For example, the power conversion circuitry 30 may convert power between alternating current (AC) and direct current (DC), then to controlled frequency AC output power, or may control the parameters of the output power supplied to the motor 18.

The control circuitry 32 controls the speed of the motor 18 by controlling switches (e.g., IGBTs) within the power conversion circuitry 30, thereby adjusting the power supplied to the motor 18. As shown, the control circuitry 32 includes a processor 36 and memory 38 to store and execute instructions to control the speed (and torque, etc.) of the motor 18 and to troubleshoot the motor drive system 10. These instructions may be encoded in software programs that may be executed by the processor 34. Further, the instructions may be stored in a tangible, non-transitory, computer-readable medium, such as the memory 38. The memory 38 may include, for example, random-access memory, read-only memory, rewritable memory, hard drives, and the like.

In a presently contemplated embodiment, the control circuitry 32 monitors the overall operation of the motor drive system 10. As shown, sensors 40 and 42 are communicatively coupled to the control circuitry 32. The sensors 40 and 42 detect various operating conditions of the machine system 14 and the motor drive 28, respectively. The type of detected operating conditions may vary widely among embodiments, and may include voltages, currents, speeds, temperatures, pressures, liquid levels, and the like. For example, the sensor 40 may detect current and voltage supplied to the motor 18. Based on the detected parameters, the control circuitry 32 may determine that an operational issue exists (e.g., a short circuit, an open wire, electrical or other malfunction) within a component of the motor drive system 10. In order to facilitate a quick resolution of the detected operational issue, the control circuitry 32 may display information in the form of an error code along with the associated barcode 12 (e.g., dynamic barcode 44). In general, however, any dynamic barcode may be generated and displayed, and these may either directly provide information (i.e., by the data encoded) or indirectly lead to useful information (e.g., by directing the reading device or an associated device to an internal or external data source).

For example, the control circuitry 32 may detect an anomaly in the output signals provided to the motor 18. The control circuitry 32 then generates the dynamic barcode 44 and encodes associated troubleshooting instructions within the dynamic barcode 44. For example, the dynamic barcode 44 may encode instructions about how to address the anomaly to resolve the issue. The operator may use the user device 27 to scan and decode the troubleshooting instructions from the dynamic barcode 44, which may then be displayed as plain text. When the instructions are encoded as plain text within the dynamic barcode 44, the user device 27 may decode the instructions and display the plain text even without a connection to an internal network or to the Internet.

In certain embodiments, the dynamic barcode 44 may encode a link (e.g., a uniform resource loader, or URL) to a site containing the troubleshooting instructions. As will be appreciated, the encoded site may be internal or external to the organization in which the motor drive system 10 is installed. For example, the encoded site may link to a third-party user manual with troubleshooting information. Additionally or alternatively, the encoded site may link to an internal site that provides dynamic (e.g., near-real time) or historical information (e.g., from a plant monitoring system 46) regarding operation of the motor drive 28.

As shown, the control circuitry 32 is communicatively coupled to the plant monitoring system 46 (e.g., distributed control system) via network interfaces 48 and 50. The plant monitoring system 46 includes memory 52 (e.g., a database) that is communicatively coupled to the machine system 14. The memory 52 stores historical operating data for the motor drive 28 and the motor 18. In certain embodiments, the plant monitoring system 46 may receive historical operating data from additional components, such as additional motor drive systems and the like.

In order to resolve troubleshooting issues, it may be desirable to examine historical operating data to identify trends. Accordingly, the troubleshooting instructions encoded by the dynamic barcode 44 may include a database query. The user device 27 scans and decodes the database query, which subsequently retrieves historical operating data from the memory 52 of the plant monitoring system 46. The database query may retrieve a variety of operating data for the motor 18 and the motor drive 28, such as currents, voltages, speeds, flow rates, temperatures, pressures, and the like. The user device 27 may display the historical operating data (e.g., as a chart) alongside the troubleshooting instructions in order to facilitate a speedy resolution of the operating issue. That is, the troubleshooting instructions may be retrieved from a variety of sources (e.g., from the barcode itself as plain text, from a site, and/or from a database query). Accordingly, the user device 27 may be communicatively coupled to both the external resources 54 (e.g., the Internet) and the plant monitoring system 46, but may selectively receive troubleshooting information from either.

In certain embodiments, the troubleshooting instructions may be stored in various memory components of the motor drive system 10. For example, the memory 38 of the control circuitry 32 may store data relating to operational issues and their associated troubleshooting instructions (e.g., an error code library). When an operational issue is detected, the control circuitry 32 determines the appropriate error code, generates the dynamic barcode 44, and displays the dynamic barcode 44 from the error code library. Thus, it may be desirable to maintain an up-to-date error code library within the memory 38 to ensure appropriate troubleshooting instructions. To this end, the memory 38 is communicatively coupled to one or more external resources 54 through the network interface 48. The memory 38 may periodically update its error code library by downloading later versions from the one or more external resources 48. As will be appreciated, the memory 38 and other components of the control system 28 may communicate using wired communications, wireless communications, and the like.

Figure 2:
FIG. 2 is an illustration an embodiment of the barcode of FIG. 1.

FIG. 2 illustrates an embodiment of the barcode 12 (e.g., the static barcode 26 or the dynamic barcode 44). The barcode 12 is generally a two-dimensional barcode, but may be one-dimensional in certain embodiments. As shown, the barcode 12 includes black modules 56 arranged on a white background 58. The arrangement of the black modules 56 defines the encoded machine-readable data within the barcode 12. As noted earlier, the encoded information may include plain text, database queries, links to sites (e.g., URLs), or any combination thereof, to assist with troubleshooting the motor drive system 10.

Figure 3:
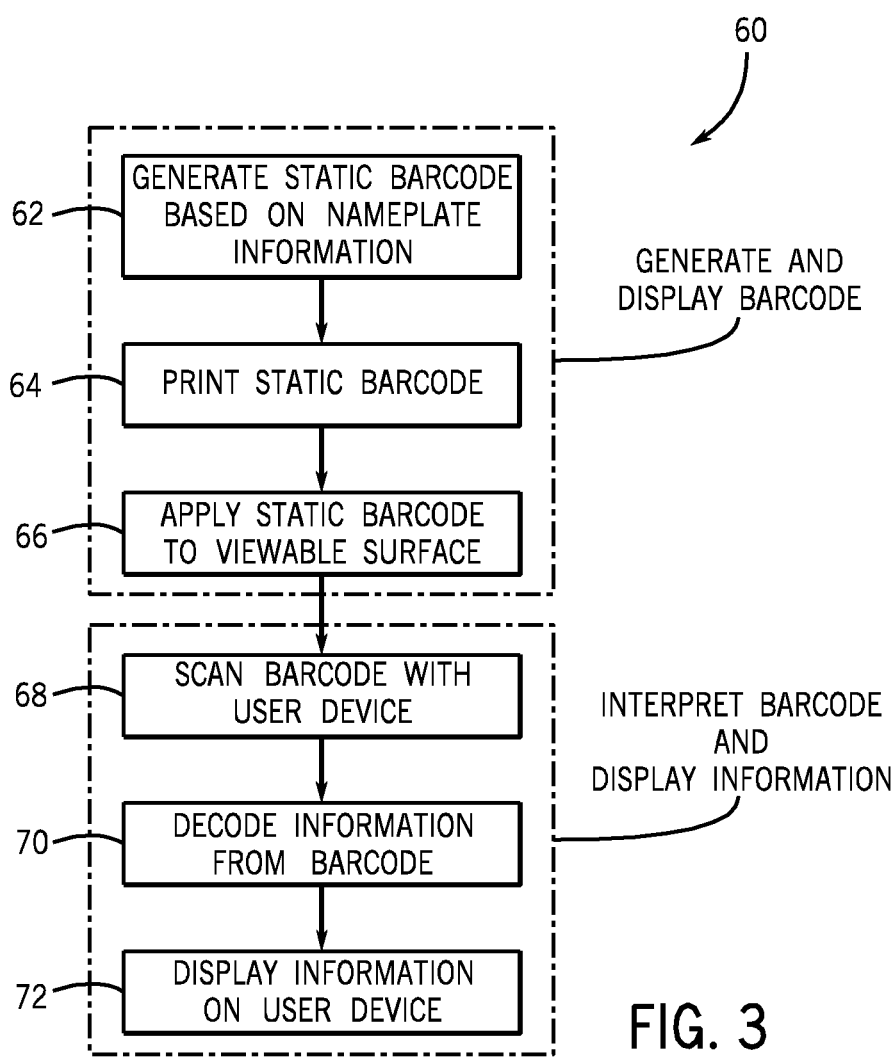
FIG. 3 is a flowchart of an embodiment of a method to generate and interpret a static barcode for the motor drive system of FIG. 1.

FIG. 3 is a flowchart of an embodiment of a method 60 to troubleshoot the motor drive system 10 using the static barcodes 26. In general, a processor generates the static barcode 26, and the static barcode 26 is subsequently displayed on a viewable surface of the machine system 14. Then, a user device 27 scans and decodes the static barcode 26. The decoded information is displayed on the user device 27.

In particular, a processor (e.g., 38) generates (block 62) the static barcode 26 based on the information to be encoded. A printer then prints (block 64) the static barcode 26 (e.g., sticker). An operator applies (block 66) the static barcode 26 to a viewable portion of the motor 18 and/or the motor drive 28. During, before, or after operation of the motor drive 28, the operator may scan (block 68) the static barcode 26 with the user device 27. The user device 27 decodes (block 70) information from the static barcode 26 and displays (block 72) the information in a suitable format for the operator. As explained earlier, the encoded information may encode plain text, a database query, a site, or any combination thereof. Accordingly, decoding (block 70) the information may include retrieving information from the plant monitoring system 46 and/or the external resources 54 (e.g., websites).

Figure 4:
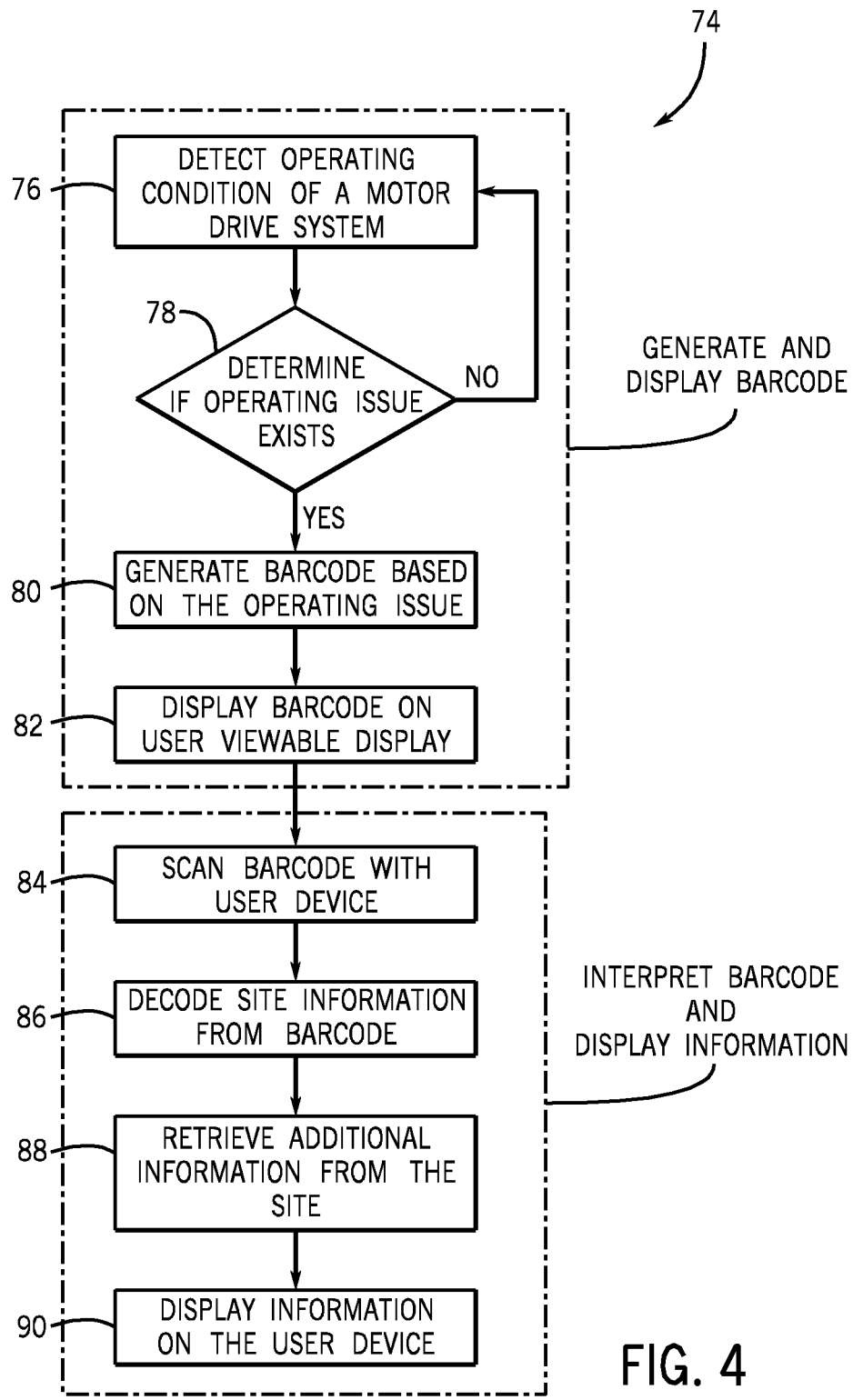
FIG. 4 is a flowchart of an embodiment of a method to generate and interpret a dynamic barcode for the motor drive system of FIG. 1.

FIG. 4 is a flowchart of an embodiment of a method 74 to troubleshoot the motor drive system 10 using the dynamic barcode 44. Again, in general, the dynamic barcode 44 is first generated and displayed. Then, the dynamic barcode 44 is interpreted and the decoded information is displayed on the user device 27.

The sensors 40 and 42 detect (block 76) an operating condition associated with the motor drive system 10. The operating condition may be a temperature, pressure, lube oil level, speed, acceleration, current, voltage, or any other measurable or calculated parameter. The control circuitry 32 determines (block 78) if an operating issue exists. For example, the control circuitry 32 may compare the detected operating condition to a threshold stored within the memory 38. If the detected operating condition is above or below the threshold (or more generally, if any recognizable condition is met), the control circuitry 32 may determine (block 78) that an operating issue exists. Accordingly, when an operating issue exists, the processor 36 generates (block 80) the dynamic barcode 44 based on the operating issue. Generating the dynamic barcode 44 includes encoding plain text, a URL, a database query, or any combination thereof, into the dynamic barcode 44. The dynamic barcode 44 is subsequently displayed (block 82) on the display 44 of the control system 28.

The user device 27 scans (block 84) the dynamic barcode 44. Then, the user device decodes (block 86) site information from the dynamic barcode 44 and retrieves (block 88) additional information from the site. Again, the dynamic barcode 44 may directly encode all of the information, and thus the user device may not retrieve (block 88) additional information from the site. As noted earlier, the site may be external or internal to the organization in which the motor drive system 10 is installed. That is, the site may be an internet-based resource (i.e., external site) or the plant monitoring system 46 (i.e., internal site). After retrieving the additional information from the site, the user device displays (block 90) this information in a suitable form for the operator. Depending on the type of data, the information may be displayed in a tabular form, as a chart, a paragraph, and/or the like.

Technical effects of the disclosed embodiments include a system to enable efficient troubleshooting for a motor drive system 10. In particular, the barcode 12 may be disposed on the motor 18 or the motor drive 28 of the motor drive system 10. The barcode 12 may be static (e.g., a sticker) or dynamic (e.g., a digital image generated and shown on the display 34). The barcode 12 provides information relating to the motor 18 or operation of the motor drive system 10. For example, the static barcode 26 may provide plain text information related to a nameplate of the motor 18. On the other hand, the dynamic barcode 44 may provide a network address that subsequently provides troubleshooting guidance for the motor 18. The barcode 12 enables a user with the user device 27 (e.g., barcode reader on a phone) to obtain information from a variety of resources to assist with diagnostics for the motor drive system 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor drive system comprising:
   a motor drive configured to provide signals to an electric motor to drive the motor in operation;
   a barcode disposed on the motor drive and configured to be scanned by a user device to provide the user device with information relating to the motor drive or operation of the motor drive.

2. The motor drive system of claim 1, wherein the barcode directly encodes the information relating to the motor drive or operation of the motor drive.

3. The motor drive system of claim 1, wherein the barcode encodes site information for a site to which the user device is directed to obtain the information relating to the motor drive or operation of the motor drive.

4. The motor drive system of claim 3, wherein the site comprises a web site external to an organization in which the motor drive system is installed.

5. The motor drive system of claim 3, wherein the site comprises a network address internal to an organization in which the motor drive system is installed.

6. The motor drive system of claim 5, wherein the network address provides dynamic or historical information regarding operation of the motor drive.

7. The motor drive system of claim 1, wherein the barcode is a static barcode applied to a viewable portion of the motor drive.

8. The motor drive system of claim 1, wherein the barcode is a dynamic barcode generated by circuitry within the motor drive and displayed on a user viewable display.

9. The motor drive system of claim 8, wherein the barcode encodes the information relating to the motor drive or operation of the motor drive.

10. The motor drive system of claim 8, wherein the barcode encodes site information for a site to which the user device is directed to obtain the information relating to the motor drive or operation of the motor drive.

11. A motor drive system comprising:
an electric motor having a rotor and a stator;
an encoder configured to monitor linear or rotary movement of the rotor;
a motor drive configured to provide signals to the electric motor to drive the motor in operation, the motor drive comprising control circuitry configured receive feedback from the encoder and to drive the motor based on the signal; and
a barcode dynamically generated by the motor drive and displayed on a user viewable display disposed on the motor drive, the barcode encoding site information for a site to which the user device is directed to obtain information relating to the motor drive or operation of the motor drive.

12. The motor drive system of claim 11, wherein the site comprises a web site external to an organization in which the motor drive system is installed.

13. The motor drive system of claim 11, wherein the site comprises a network address internal to an organization in which the motor drive system is installed.

14. The motor drive system of claim 13, wherein the network address provides dynamic or historical information regarding operation of the motor drive.

15. The motor drive system of claim 11, wherein the site comprises information relating to an operational issue experienced by the motor drive, the encoder or the motor, or a combination thereof.

16. The motor drive system of claim 11, wherein the barcode comprises machine-readable data configured to encode the information, and the information comprises at least one of a uniform resource locator, a database query, plain text, or a combination thereof.

17. An industrial automation system comprising:
a motor drive configured to provide signals to an electric motor to drive the motor in operation;
a user viewable display disposed on the motor drive; and
a barcode dynamically generated by the motor drive and displayed on the user viewable display, wherein the barcode provides information relating to an operational issue experienced by the industrial automation system.

18. The industrial automation system of claim 17, wherein the barcode encodes site information for a site to which the user device is directed to obtain the information relating to the operational issue.

19. The industrial automation system of claim 18, wherein the site comprises a web site external to an organization in which the industrial automation system is installed.

20. The industrial automation system of claim 18, wherein the site comprises a network address internal to an organization in which the industrial automation system is installed.

* * * * *